Sept. 7, 1943. J. M. AUZIN 2,328,769
APPARATUS FOR MANUFACTURING DIPPED RUBBER ARTICLES
Filed Nov. 27, 1939

INVENTOR
John M. Auzin
BY
Nathaniel Frucht
ATTORNEY

Patented Sept. 7, 1943

2,328,769

UNITED STATES PATENT OFFICE 2,328,769

APPARATUS FOR MANUFACTURING DIPPED RUBBER ARTICLES

John M. Auzin, Warwick, R. I., assignor to Davol Rubber Company, a corporation of Rhode Island Application November 27, 1939, Serial No. 306,222

2 Claims. (Cl. 18—41)

My present invention relates to the manufacture of hollow rubber articles, and has particular reference to novel expansion forms therefor.

It is the principal object of my invention to provide an improved expansion form for manufacturing rubber articles of hollow type.

It is a further object of my invention to manufacture hollow rubber articles of any desired shape, in a simple and inexpensive manner.

Another object of my invention is to manufacture hollow rubber articles by dipping.

With the above and other objects and advantageous features in view, my invention consists of a novel method and a novel apparatus, more fully described in the detailed description following, in conjunction with the accompanying drawing, and more specifically defined in the claims appended thereto.

It has been found desirable to provide an expansion form for the manufacture of hollow articles by dipping in a coating with a suitable material in solution, as for example latex or other suitable rubber solution or a solution of a material such as cellulose acetate or nitrate or the like, the form itself being of an expansible material, such as for example rubber, whereby the form may be blown to suitable size and then used as a form for dipping into or for spraying with the solution, to provide a hollow layer of material over the entire form; the hollow layer may then be cured, hardened, and the expansible form collapsed for removal from the formed hollow article, which retains its initial shape. This arrangement thus provides a simple and effective method for forming hollow articles of any desired contour and shape, by using an expansion form which is blown to attain the desired inner dimensions of the hollow article, thus permitting formation of the hollow article by dipping into or by spraying with a solution of suitable material, the blown form being subsequently collapsed and removed.

Figure 3:
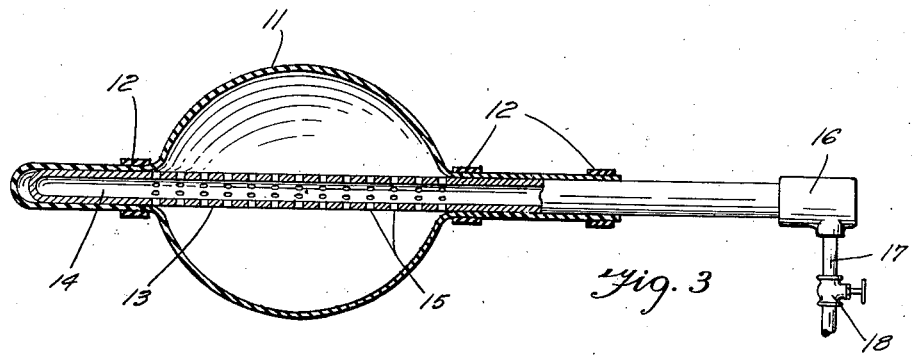
Fig. 3 is a sectional view showing the arrangement of parts for manufacturing hollow rubber articles by dipping.
Figures 2, 4:
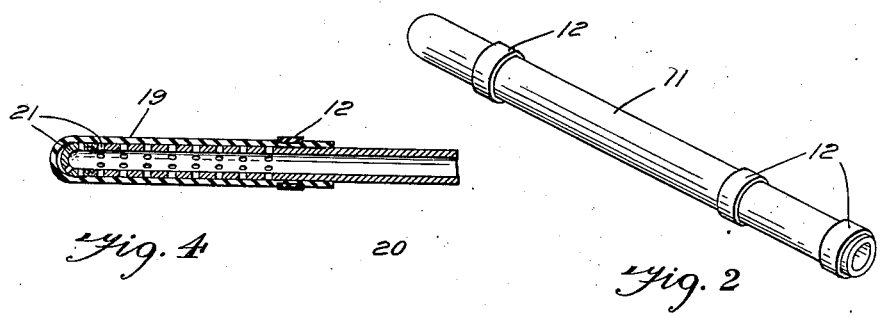
Fig. 2 is a perspective view of an expansion form for use in manufacturing hollow rubber articles.
Fig. 4 is a sectional detail of a modified arrangement.

Referring to the drawing, a hollow rubber article such as a ball 10 may be cheaply manufactured by using a preformed expansion form such as shown in Fig. 2. The form 11 is preferably formed of an elongated rubber tube, which may be closed at one end if desired or may be open at both ends and which has a plurality of heavy or less resilient bands 12 of rubber or the like spaced apart as indicated in Fig. 2. The form may be of dipped or molded rubber material, and is adapted to be mounted on a metal tube 13, see Fig. 3, which has a central bore 14 and a plurality of fluid outlet openings 15, the end being closed as with a cap 16 which is fitted with a tube 17 equipped with a valve 18 for admitting fluid, such as air, under pressure to the tube 13. When the rubber form is mounted on the metal tube 13, rubber clamps being placed at each end if desired, and fluid under pressure is admitted to the interior thereof, the fluid expands the center portion of the rubber former as indicated in Fig. 3, the heavy relatively non-resilient bands 12, however, tightly gripping the form to the metal tube 13 so as to present an intermediate expanded surface as illustrated. The entire surface of the form is initially treated with a chemical adhesion preventing material, such as for example with a bromine or a chlorine solution such as disclosed in Raiche Patent No. 2,043,630, whereby the form disclosed in Fig. 3 may be coated by dipping into a bath of latex or if preferred spraying with latex or other rubber in solution without any adherence to the form. A coating of rubber is thus obtained on the outer surface of the blown form, it being preferred to alternately dip the form into the rubber solution and into a coagulating solution until the desired thickness of outer layer is provided. The pressure fluid is then released from the dipped form by opening the valve 18, and the latex layer is cured; the metal and rubber forms are then withdrawn from the cured outer layer, which is then leached for an extended time depending upon the thickness of the rubber, preferably in hot water, in order to remove water soluble proteins from the rubber. The hollow article is then dried and trimmed for the necessary fittings.

Figure 1:
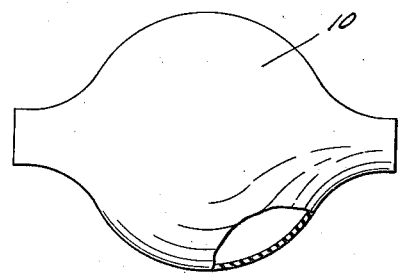
Fig. 1 is a plan view, partly broken away, showing a finished rubber article of hollow construction made in accordance with my invention.

When dipping a hollow ball such as shown in Fig. 1, I have found that immersion of the blown rubber form into a latex or other rubber solution results in a slight tendency to collapse due to the pressure of the solution; but the removal of the dipped form between successive dips and for dipping in the coagulating solution permits an expansion of the air within the form to cure any partial collapse, and to again restore the form to its original blown form. The size of the blown form is controlled by using standard length and width gauges to check the expanded size. The shape of the outer layer may also be changed after partly drying, by removing the shaped article from the form and shaping, as for example flattening the bottom of a bulb, before final drying, curing and leaching.

Figure 5:
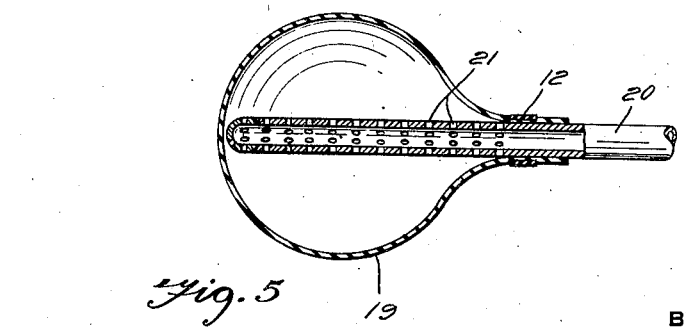
Fig. 5 is a view thereof with the parts arranged for the dipping operation.

Any desired shape of hollow article may be made by using a rubber form of the proper shape, as indicated for example in Figs. 4 and 5, which show a suitable arrangement for blowing a ball having a closed end. The rubber tube form 19 is shown as slipped over a metal tube 20 which has air ducts 21 in the sides and also in the end, so that the blown up form assumes the position shown in Fig. 5. If it be preferred that one side of the blown article have a greater taper than the other side, this can be readily accomplished by shaping the band 12 on one side so as to provide a gradual slope for the form when it is blown up, instead of an abrupt turn as shown in Fig. 3. Any other suitable arrangement may be conveniently made to obtain a hollow article of desired contour; for example, the form may, if desired, be left in the completed article, in which case the form need not be treated with an adhesion preventing material.

The above-described arrangement provides a simple and effective manufacturing procedure for obtaining hollow articles at low cost, as the life of the form continues for a long time until its resilience is impaired. Certain hollow articles may, if desired, permanently retain the elastic form; for such constructions, it is preferred to treat the surface of the elastic form with an adhesive material or by using an adhesive material for the form material. Thus, a latex form, if it is not surface treated and if it is sufficiently dry, will become integral with the applied outer layers, and become a permanent part of the completed article.

While I have described a specific constructional embodiment of my invention, it is obvious that the expansible form may be made of any desired material and of any desired blown shape, and that the metal tube 13 may be of other suitable material, if desired, whereby the arrangement provides an expansion dipping or spraying form which is shaped to operating size and shape by means of fluid pressure, and preferably by air pressure.

I claim:

1. A device for manufacturing hollow rubber articles by dipping, comprising an elongated fluid conduit having a fluid inlet at one end and closed at the opposite end, a hollow rubber form mounted to envelop a substantial portion of said conduit including said opposite end, means sealing said form to said conduit to provide a closed chamber about the enveloped portion of said conduit, and means comprising vents intermediate the ends of the conduit and located in the portion of the conduit enveloped by said rubber form and positioned in the closed chamber, for admitting fluid under pressure to expand the form.

2. A device for manufacturing hollow rubber articles by dipping, comprising an elongated fluid conduit having a fluid inlet at one end and closed at the opposite end, a hollow rubber form mounted to envelop a substantial portion of said conduit including said opposite end, means sealing the ends of said form to said conduit to provide a closed chamber about the enveloped portion of said conduit, and means comprising vents intermediate the ends of the conduit and located in the portion of the conduit enveloped by said rubber form and positioned in the closed chamber between the sealed ends thereof, for admitting fluid under pressure to expand the form.

JOHN M. AUZIN.